United States Patent [19]
Bayly et al.

[11] Patent Number: 4,909,276
[45] Date of Patent: Mar. 20, 1990

[54] PRESSURE RESPONSIVE VALVE

[75] Inventors: Peter K. Bayly, Kangaroo Ground; John E. Oretti, Doncaster, both of Australia

[73] Assignee: Kingsley Nominees Pty. Ltd., Australia

[21] Appl. No.: 201,033

[22] Filed: Jun. 1, 1988

[30] Foreign Application Priority Data

Jun. 2, 1987 [AU] Australia .................... PI2258

[51] Int. Cl.[4] ........................... F16K 17/196
[52] U.S. Cl. ................... 137/467; 220/203; 220/208; 251/75
[58] Field of Search ............ 137/467; 251/75; 220/203, 208, 209

[56] References Cited

U.S. PATENT DOCUMENTS

| | | | |
|---|---|---|---|
| 2,521,891 | 9/1950 | Beams | 251/75 |
| 2,670,755 | 3/1954 | Kendrick | 137/467 |
| 3,112,768 | 12/1963 | Thompson | 251/75 X |
| 3,417,768 | 12/1968 | Wasson | 251/75 X |
| 3,559,945 | 2/1971 | Coiner et al. | 251/75 X |
| 4,162,741 | 7/1979 | Walker et al. | 137/467 X |
| 4,165,762 | 8/1979 | Acar | 251/75 X |

FOREIGN PATENT DOCUMENTS 850505 9/1952 Fed. Rep. of Germany ........ 251/75

Primary Examiner—Stephen M. Hepperle
Attorney, Agent, or Firm—Stevens, Davis, Miller & Mosher

[57] ABSTRACT

A pressure relief valve and especially such a valve for use in the lid or other part of a cooking vessel. It is a feature of the valve that it automatically opens in response to certain pressure conditions, and requires manual resetting to the closed condition. The valve includes a closure member which is movable between valve open and valve closed positions, and a configuration dependent hold-open member which is operative, in one configuration, to bias the closure member into the open position and to hold it in that position. The hold-open member is annular and has a frusto-conical form in the operative configuration. An actuator is operable to move the closure member from the open position to the closed position, and the hold-open member responds to that movement by adopting a reversed conical configuration. The hold-open member is subjected to stress when moving between the two conical configurations and that stress is at least partially relieved at each of the open and closed positions of the valve. Because of that stress relief, the hold-open member has an oppositely directed biasing effect on the closure member in each of the two conditions of the valve.

26 Claims, 3 Drawing Sheets

PRESSURE RESPONSIVE VALVE

BACKGROUND OF THE INVENTION

This invention relates to pressure responsive valves of the kind which are operable to vent a space to atmosphere when the pressure within that space rises above a predetermined level. One application of such valves is in relation to cooking vessels such as pressure cookers, and it will be convenient to hereinafter describe the invention with particular reference to that example application.

Pressure relief valves as used in cooking vessels prior to the present invention suffer a variety of problems. Particularly prevalent problems are complex construction and ineffective operation. Operation may be ineffective because of the valve sticking, and that can lead to dangerous situations. Furthermore, a great many prior valves automatically reset to the closed position so there is no visible sign of an excessive pressure condition having been reached, and that leads to the possibility of the excessive pressure condition being repeated. Valves which do not reset automatically are generally inconvenient to restore to an operation condition, and in some cases at least one part may become completely detached from the associated vessel when the valve opens.

It is an object of the present invention to provide a valve of the foregoing kind which is of relatively simple construction and which is effective and convenient in use. It is a further object of the invention to provide a cooking vessel having the improved valve as a pressure relief valve.

SUMMARY OF THE INVENTION

A valve according to the invention is characterized in that it includes means which is operable to hold the valve in an open position, but which is rendered inoperable for that purpose when the valve is closed. That means is configuration dependent in that its hold-open facility is derived from a tendency to adopt a particular configuration, and in the closed position of the valve the hold-open means is restrained against adopting that configuration.

According to one form of the invention, the hold-open means imposes a bias on the valve and the direction of that bias changes in accordance with changes in the configuration of the hold-open means. That is, the bias tends to urge the valve into a closed condition when the hold-open means has one configuration, and tends to urge the valve into an open condition when the hold-open means has another configuration. The bias is preferably an internal bias in that it is generated by the hold-open means itself, but it may be assisted by an external bias, particularly in the case of the open condition of the valve.

In accordance with the present invention, there is provided a pressure responsive valve including, means defining an opening through which communication occurs between two sides of the valve, a closure member which is operative to control said communication and which is mounted for movement between a closed position at which said communication is prevented and an open position at which said communication is permitted, said valve being responsive to a pressure differential between said sides so as to cause said closure member to move from the closed position towards the open position, and hold-open means which is configuration dependent and is arranged to adopt an operative configuration at which it is operative to bias said closure member towards said open position and to adopt a different configuration at which it is not so operative, said hold-open means being responsive to movement of said closure member so as to adopt a said different configuration when said closure member is in said closed position and to adopt a said operative configuration when said closure member is at a position spaced from said closed position.

In the case of application of the invention to pressure cookers and other cooking vessels, it is generally convenient to associate the valve of the invention with the lid or other closure for that vessel. It will be convenient to hereinafter describe particular embodiments of the invention as applied to the lid of a cooking vessel.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

DESCRIPTION OF PREFERRED EMBODIMENTS

Figure 1:
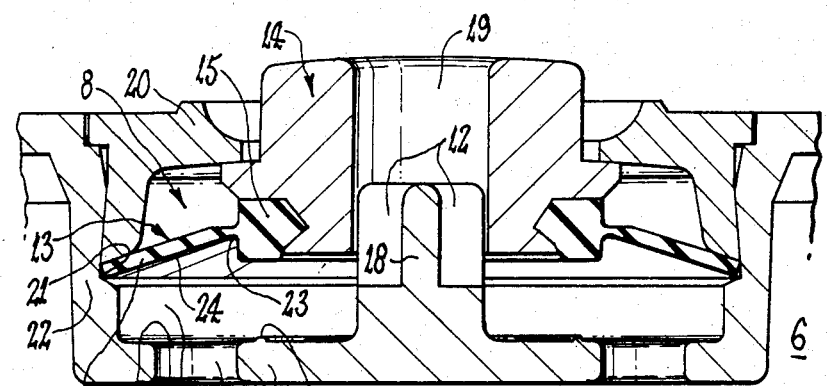
FIG. 1 is a cross-sectional view of a valve according to one embodiment of the invention shown in the open condition.
Figure 2:
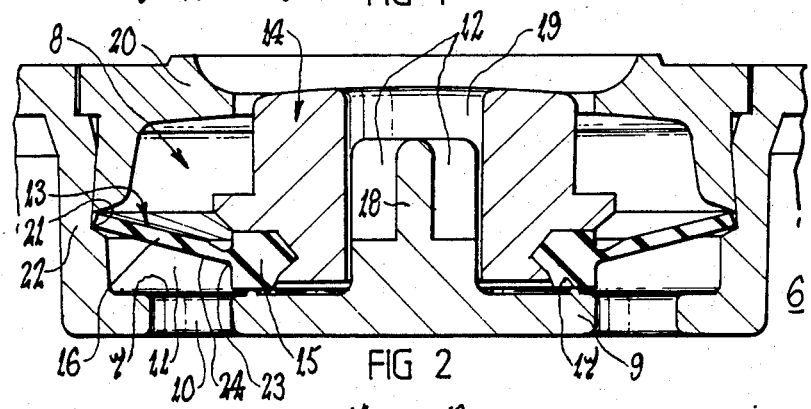
FIG. 2 is a view similar to FIG. 1 but showing the valve in a closed position.
Figure 3:
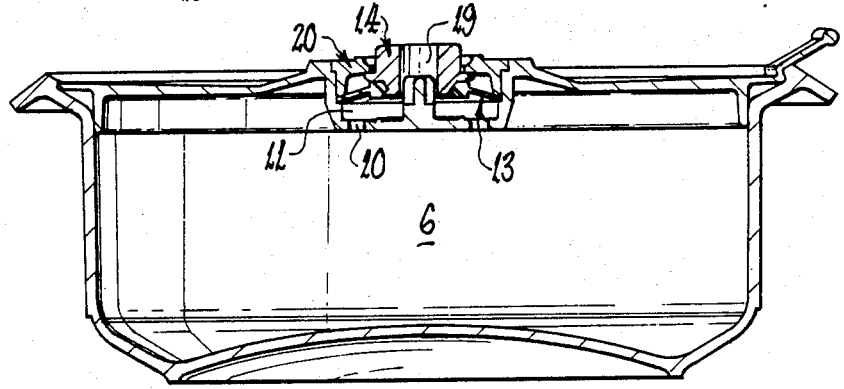
FIG. 3 shows the valve of FIG. 1 as part of the lid of a cooking vessel.

In the particular embodiment of the invention as shown in FIGS. 1 to 3, the valve 1 is provided in the lid 2 of a cooking vessel 3. The vessel 3 includes a body 4 having an open mouth 5 at the top through which material is introduced into and removed from the vessel 3, and the lid 2 is arranged to close that mouth 5 as required. The valve 1 is arranged to relieve excess pressure built up within the interior 6 of the body 4 and therefore functions as a pressure relief or safety valve.

The particular valve 1 as shown in arranged to seal against an opposed surface 7 of the lid 2. For that purpose, the cooker lid 2 has a cylindrical cavity 8 formed in an upper surface thereof, preferably at or adjacent the centre of the lid 2. The base wall 9 of that cavity 8 provides or includes the valve seating means. Any suitable port means may be provided to connect a lower region of that cavity 8 with the interior 6 of the vessel body 4, and that port means forms part of an opening through which the interior 6 is connected to atmosphere. In the construction shown, the opening includes a plurality of ports or apertures 10 which connect the interior 6 to a space 11 in the lower part of the cavity 8, and a plurality of passages 12 which connect the space 11 to atmosphere. Other arrangements are obviously possible. The communication between the passages 12 and the aperture 10 is cut-off when the valve is closed as hereinafter described.

The particular valve 1 as shown comprises two major components, a valve member 13 and a valve actuator 14 which is used to re-establish the closed condition of the valve 1. In other embodiments, however, the valve may be formed of only one component, or it may be formed of more than two components. The valve member 13 is connected to both the actuator 14 and the lid 2 as hereinafter described.

The valve member 13 as shown includes a core or hub 15 which provides means for mounting the member 13 on the actuator 14 and which also functions as a valve closure member. The valve member 13 also includes an annular plate-like member 13 which surrounds and extends outwardly from the hub 15 and which forms a configuration dependent hold-open means of the valve. The valve 1 also includes sealing means which is formed by or includes the hub 15 and a circular rib 17 formed on and standing proud from the base wall surface 7. The hub 15 and rib 17 engage in the closed condition of the valve 1 as shown in FIG. 2.

According to the particular arrangement shown, the valve member 13 is formed as a single piece from a suitable plastics material such as silicone or other material having some degree of flexibility. The hub 15 of the valve member is in the form of an annulus which is attached to the lower end of the actuator 14 so that the hub 15 and the actuator 14 move together as hereinafter described. The attachment is shown as being effected through snap engagement of the hub 15 within a complementary groove formed in the actuator 14, but other forms of attachment could be employed.

The actuator 14 is mounted for movement relative to the lid 2, and in the particular arrangement shown that is effected by slidably locating the actuator 14 on a stem 18 which extends upwards from the base wall 9 and is located substantially at the centre of the cavity 8. The stem 18 projects into a central open ended bore 19 of the actuator 14 and has the aforementioned passages 12 formed therein as shown. An annular cap member 20 may be secured within the mouth of the cavity 8 as shown to limit upward travel of the actuator 14.

In the arrangement shown, the annular hold-open means 13 is of plate-like form and has its radially inner and outer peripheries attached to the closure member or hub 15 and to the lid 2, respectively. The outer periphery attachment is shown as location of that outer periphery within a circumferential groove 21 formed at the side wall 22 of the cavity 8, but other arrangements are possible. The groove 21 is dimensioned so as to contain the outer periphery of the annular member 13 in such a way as to prevent substantial axial movement of that periphery relative to the lid 2, but without preventing operative movement of the annular member 13 as hereinafter discussed. A relatively thin hinge portion 23 connects the inner periphery of the annular member 13 to the hub 15.

The annular member 13 is formed so as to have a natural bias into the conical or frusto-conical form as shown in FIG. 1. In that form, the member 13 is concave at its lower side 24, which is the side adjacent the base wall surface 7. The arrangement is such that the member 13 can support the closure member hub 15, and attached actuator 14, in the raised valve open position as shown in FIG. 1. That function of the member 13 is a configuration dependent function because it relies on the upward concavity of the member 13, subject of course to the member 13 being sufficiently stiff to resist deflection, or radial buckling, under the combined load of the hub 15 and the actuator 14. The configuration of the member 13 as shown in FIG. 1 is the operative configuration of that member.

It is a feature of the particular construction shown that the member 13 is movable about the hinge 23 so as to adopt a different position relative to the hub 15 and in particular adopt a reversed configuration at which it slopes upwardly and outwardly from the hub 15 as shown in FIG. 2. That reversed or upwardly concave configuration is the non-operative configuration of the member 13 in that the member 13 is no longer able to impose an upward valve opening bias on the closure member hub 15. In fact, the member 13 may impose a downward bias on the hub 15 when in the configuration shown in FIG. 2, and that will occur if the member 13 remains under stress as discussed below. Even in the absence of such stress, however, the configuration of the annular member 13 as shown in FIG. 2 is such as to resist movement of the hub 15 out of the valve closed position, and as a consequence the member 13 imposes a closing bias on the valve 1.

Movement of the member 13 from the FIG. 1 condition to the FIG. 2 condition is achieved by pressing down on the actuator 14 and thereby defeating the upwardly directed bias of the member 13. As the actuator 14 moves down, the member 13 is progressively forced towards a flattened or non-conical configuration, and that flattening is accompanied by a build-up of internal stress within the member 13. The stress is predominantly compressive in nature because in the flattened condition the radial surface length of the member 13 has been reduced. In that regard, the radial surface length is the distance measured across the surface of the member 13 from the inner periphery thereof to the outer periphery thereof. That is, the member 13 must be forced through a space which is smaller than the natural (relaxed) size of the member 13.

As the member 13 is moved downwards beyond the flattened condition, the internal stresses tend to be relieved because of the resulting ability of the member 13 to return towards its natural larger size. That relief of stress imposes a downward force on the hub 15, and consequently the actuator 14, and such a condition will continue to exist if all internal stress is not relieved at the closed condition of the valve as shown in FIG. 2.

The valve 1 will open automatically in response to establishment of a sufficiently high pressure differential between the opposite sides of the member 13. That is, the existence of high pressure within the body interior 6 will force the member 13 upwards towards a flattened configuration with consequent establishment of internal stress which when relieved will be translated into an upward bias on the hub 15 and the actuator 14. That bias completes the opening movement of the valve 1 and tends to hold the valve in its open condition. It will be appreciated that the configuration of the member 13 as shown in FIG. 2 resists initial upward travel of the hub 15 and actuator 14, and consequently the pressure acting below the member 13 must be sufficiently high to defeat that resistance.

Figure 4:
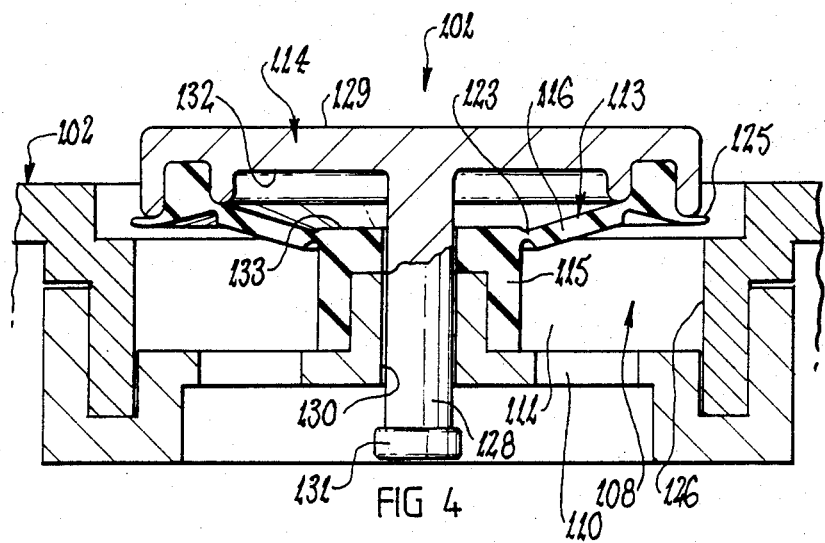
FIG. 4 is a view similar to FIG. 1 but showing a different embodiment of the invention.
Figure 5:
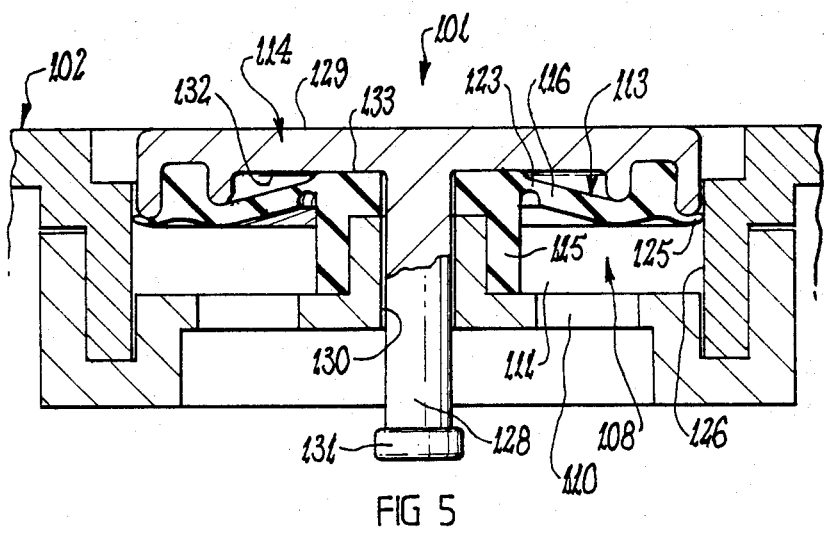
FIG. 5 is a view of the FIG. 4 valve in the closed position.

FIGS. 4 and 5 show another form of valve in accordance with the invention. Components of that valve which correspond to components of the valve first described, will be given like reference numerals except that they will be in the number series 100 to 199.

The valve 101 of FIG. 4 differs from the valve of FIG. 1 in that the annular member 116 has its outer periphery connected to the actuator 114 and its inner periphery connected to the lid 102. That is the reverse of the situation with the FIG. 1 valve. In addition, the sealing means of the FIG. 4 valve includes a flexible sealing lip 125 which is connected to and is located around the outer periphery of the annular member 116. The lip 125 forms the valve closure member and engages with the cylindrical surface 126 of the cavity 108 when the valve 101 is in a closed condition as shown in FIG. 5.

In the FIG. 4 arrangement, an annular bead 127 extends around the outer periphery of the annular member 116 so as to intervene between that periphery and the sealing lip 125. That bead 127 forms part of the connection between the annular member 116 and the actuator 114, but other means could be used for that purpose.

The particular actuator 114 shown is in the form of a press button having a guide stem 128 and a circular plate-like section 129 at one end of that stem 128. The stem is slidably located in a bore 130 which extends through the base of the cavity 108. The plate-like section 129 overlies the annular member 116 and forms a relatively rigid cap for the valve 101, and the diameter of the section 129 is such that it will fit within the cylindrical cavity 108 with clearance. The diameter of the sealing lip 125, when relaxed as shown in FIG. 4, is larger than that of the cavity 108 so as to be an interference fit within that cavity 108.

When the valve 101 is in a relaxed or unstressed condition as shown in FIG. 4, the annular member 116 slopes outwardly and upwardly as previously described, and in that condition supports the actuator 114 in a raised position. That supporting function of the annular member 116 is achieved by its resistance to radial buckling as previously referred to. In that condition of the valve 101, the sealing lip 125 and the actuator 114 are located above and clear of the upper edge of the cylindrical seating surface 126 so that the interior of the cavity 108 is exposed to atmosphere.

It is preferred that retaining means is provided to resist or prevent separation of the actuator 114 from the lid 102. That may be achieved as shown by providing the actuator stem 128 with an enlargement 131 at its lower end which, during assembly of the valve 101, snaps through the lower end of the bore 130 and thereafter functions to resist separation of the actuator 114 from the lid 102.

Closing of the valve 101 is effected by pressing down on the actuator 114 so as to force the annular member 116 out of its upwardly sloping configuration and towards a flattened (non-conical) configuration. Such a change in configuration of the annular member 116 is made possible by the resilient nature of the material from which the annular member 116 is composed and involves distortion of the annular member 116 such as to induce internal stress which tends to restore the annular member 116 to its original conical configuration. The magnitude of the restoring forces of course increase with the magnitude of distortion of the annular member 116.

It is preferred that the sealing lip 125 enters the cavity 108 before the annular member 116 reaches its non-conical condition. Such entry involves some resilient deflection or distortion of the lip 125 because of its relatively larger diameter and the lip 125 thereby sealingly engages against the cylindrical seating surface 126 of the cavity 108. Distortion of the lip 125 may be controlled to some extent by engagement between an upper surface of that lip and a downwardly facing edge of a skirt 132 formed around the outer periphery of the actuator 114.

Continued downward movement of the annular member 116 beyond the non-conical condition allows the member 116 to increase in radial surface length and thereby results in some release of the built-up restoring forces. There is also some relaxation of the distortion or deflection of the sealing lip 125, but that lip 125 nevertheless retains its sealing engagement with the surrounding seating surface 126. Stop means may be provided to limit the degree of downward movement of the annular member 116 and that may comprise a downwardly facing surface 132 of the actuator 114 and an opposed upwardly facing surface 133 of the valve member hub 115. Downward movement ceases when the surfaces 132 and 133 engage, and at that stage the annular member 116 has a downwardly sloping configuration as shown in FIG. 5.

It will be appreciated from the foregoing that there are two areas of resistance to return of the valve 101 towards its open condition. One is the tendency of the annular member 116 to retain a maximum radial surface length condition, and it must go through a minimum radial surface length condition if the valve 101 is to open. The other is the frictional engagement between the sealing lip 125 and the seating surface 126, and that could be relatively high because of the upwardly curled configuration of the lip 125. With regard to the last aspect, forced entry of the lip 125 into the cavity 108 will cause that lip 125 to adopt an upwardly curled configuration and as a result of that configuration, the resistance to upward relative movement of the lip 125 will be greater than its resistance to downward relative movement.

The various forces resisting upward movement of the valve member towards the open condition may be predetermined so that the valve 101 will open in response to exposure of the lower region of the cavity 108 to certain pressure conditions. It will be apparent from the foregoing description that the interior of the cavity 108 is exposed to the same pressure conditions as those existing within the interior of the associated cooking vessel. When that pressure rises above a predetermined level, the resistance to upward travel of the annular member 116 will be overcome so that the member 116 will be pushed upwards towards the non-conical condition. Immediately the member 116 moves beyond that condition, restoring forces as previously mentioned encourage further upward travel of the sealing lip 125 so that the valve 101 in effect snaps open. That is, there is a positive opening movement such as to maximize the pressure releasing function of the valve 101.

In view of the configuration characteristics of the annular member 116 as described, it tends to hold the valve 101 open after the vessel pressure has dropped below the aforementioned predetermined level. A positive indication of adverse pressure conditions is thereby retained until someone deliberately restores the valve 101 to its closed position. The same applies to the valve 1 of FIGS. 1 to 3. Also, in the case of both valves 1 and 101, the provision of retention means which resists separation of the valve components from the vessel lid is an important factor because continued use of the vessel will not be impaired by the need to find and replace a dislodged valve component.

Figure 6:
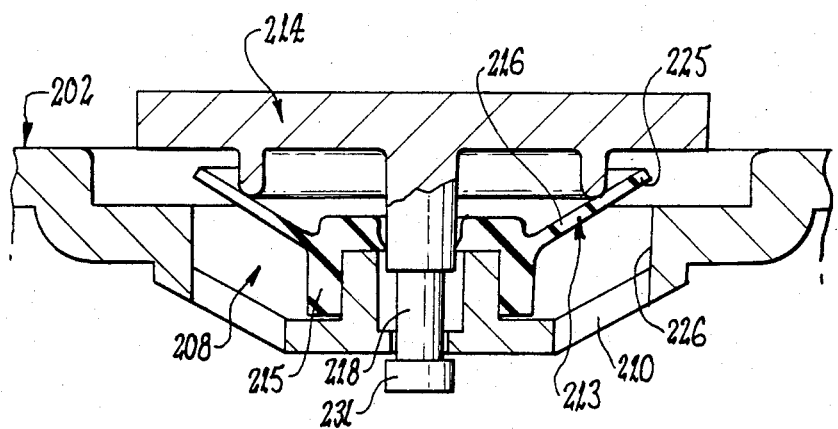
FIG. 6 is a view similar to FIG. 1 but showing yet another embodiment of the invention.
Figure 7:
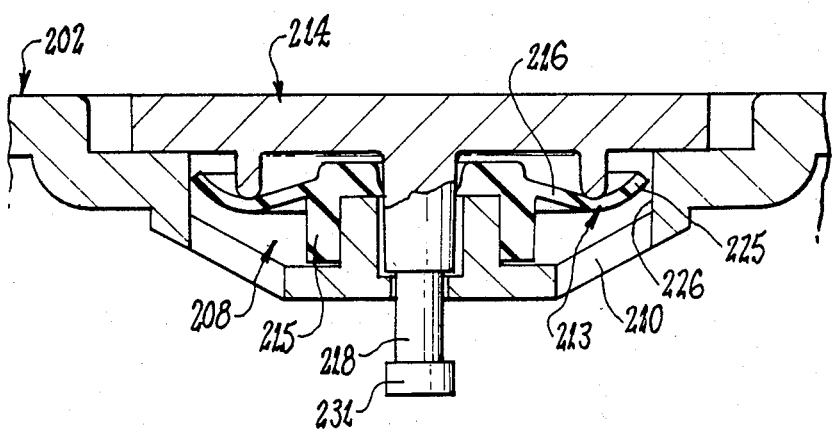
FIG. 7 is a view of the FIG. 6 valve in the closed position.

FIGS. 6 and 7 show a variation of the valve of FIGS. 4 and 5 in which there is no attachment between the annular hold-open member and the actuator. Components of that embodiment which correspond with components of the valve of FIGS. 4 and 5 will be given like reference numerals except that they will be in the number series 200 to 299.

In the FIG. 6 construction, the actuator 214 has a circular rib 234 formed on its undersurface and which projects downwardly to engage with the upper surface of the annular member 216 at a location between the inner and outer peripheries of that member 216. The member 216 is formed so as to naturally adopt an upward inclination relative to the valve member hub 215 as shown in FIG. 6. Also, the member 216 need not have the resistance to radial buckling as previously described and the sealing ring 225 is formed by a radial extension of the outer periphery of the member 216.

When the valve 201 is closed, the engagement between the member 216 and the seating surface 226 on the one hand and the rib 234 on the other, is such that the member 216 is deformed so as to be dished downwardly between its inner and outer peripheries as shown in FIG. 7. The tendency for the member 216 to return to its undistorted condition provides the bias necessary to snap the valve 201 into an open condition when pressure below the member 216 reaches a level such as to force the member 216 into an upwardly rather than downwardly dished configuration.

The concept as described can be embodied in a variety of different constructions. By way of example, the annular member need not be moulded in a conical configuration as described above. The tendency for the annular member to adopt such a configuration may be induced by the nature of the cooperative engagement between the annular member and the actuator. For example, if the annular member extends at right angles to the associated hub in the as-moulded condition, the actuator may be arranged to coact with the annular member so as to induce radial compressive forces in that member when the actuator is positioned to place the annular member at a non-inclined position relative to the hub.

In each embodiment of the invention, it is preferred that the space above the annular hold-open member is exposed to atmosphere, at least in the closed condition of the valve. That space may be arranged to capture moisture which may freeze when a device incorporating the valve is located in a refrigerator and thereby create an ice seal which improves the sealing qualities of the valve. That ice seal will of course be destroyed when the device is eventually placed in a heating environment.

It will be appreciated from the foregoing description that a valve according to the invention is able to be produced at a relatively low cost. Also, the simplicity of the valve minimizes the possibility of failure in use. Furthermore, the fact that the valve remains open until reset, and achieves that without separation of any part of the valve from the associated lid, results in a safe and convenient to use arrangement.

Various alterations, modifications and/or additions may be introduced into the constructions and arrangements of parts previously described without departing from the spirit or ambit of the invention.

I claim:

1. A pressure responsive valve including, means defining an opening through which communication occurs between two sides of the valve, a closure member which is operative to control said communication and which is mounted for movement between a closed position at which said communication is prevented and an open positioned at which said communication is permitted, said valve being responsive to a pressure differential between said sides so as to cause said closure member to move from the closed position towards the open position, and hold-open means which is configuration dependent and is flexibly distortable between an configuration and concave on a side opposite to said one side when in a said different configuration, said plate-like member being responsive to movement of said actuator so as to adopt a said different configuration when said actuator is in said closed position and to adopt a said operative configuration when said actuator is at a position spaced from said closed position, and said hold-open means being operative to hold said actuator in said open position in the absence of a closing force manually applied to said actuator which is sufficient to overcome said hold-open means bias and move said actuator into said closed position.

2. A valve according to claim 1, wherein said hold-open means is operative to resist movement of said closure member from said open position in a direction towards said closed position.

3. A valve according to claim 2, wherein said hold-open means is operative to resist movement of said closure member from said closed position in a direction towards said open position.

4. A valve according to claim 2, including an actuator which is operable to move said closure member from the open position to the closed position.

5. A valve according to claim 1, wherein sealing means operates to prevent said communication when the closure member is in said closed position, and said sealing means comprises cooperatively engageable parts of said closure member and said opening defining means respectively.

6. A valve according to claim 1, wherein said hold-open means includes an annular plate-like member of frusto-conical form and which is flexibly distortable to cause a change in the said configuration thereof.

7. A valve according to claim 6, wherein said annular member is concave on one side when in a said operative configuration and is concave on a side opposite said one side when in a said different configuration.

8. A valve according to claim 7, wherein the radially inner periphery of said annular member is attached to said opening defining means.

9. A valve according to claim 8, wherein the radially outer periphery of said annular member is attached to said closure member for movement therewith.

10. A valve according to claim 9, wherein said closure member includes a flexible sealing lip which is located around said radially outer periphery and slidably engages a cylindrical surface of said opening defining means to prevent said communication, said sealing lip not being in engagement with said cylindrical surface when the closure member is in said open position.

11. A valve according to claim 9, including an actuator which is operable to move said closure member from the open position to the closed position, and wherein said actuator is attached to said closure member for movement therewith.

12. A valve according to claim 8, wherein said closure member includes a flexible sealing lip which is located around and is connected to the radially outer periphery of said annular member and which engages a cylindrical surface of said opening defining means to prevent said communication, said sealing lip not being in engagement with said cylindrical surface when the closure member is in said open position.

13. A valve according to claim 12, including an actuator which bears against said annular member at a location between said inner and outer peripheries thereof so as to be operable to cause movement of said closure member in one direction and so as to move in response to movement of said closure member in the direction opposite to said one direction.

14. A valve according to claim 7, wherein the radially inner periphery of said annular member is attached to said closure member for movement therewith.

15. A valve according to claim 14, wherein the radially outer periphery of said annular member is attached to said opening defining means so as to be held against movement with said closure member.

16. A valve according to claim 15, wherein said radially outer periphery is located within a circumferential groove formed in said opening defining means and is thereby attached to the opening defining means and restrained against substantial axial movement relative to said opening defining means.

17. A valve according to claim 14, including an actuator which is connected to said closure member for movement therewith and which is operable to move said closure member from the open position to the closed position.

18. A valve according to claim 17, wherein said closure member comprises an annular hub which is attached to said actuator for movement therewith, and said hub is engageable with a cooperable part of said opening defining means to form sealing means which functions to prevent said communication when the closure member is in said closed position.

19. A valve according to claim 18, wherein said annular member is connected to said hub through an integral hinge such that the annular member is movable relative to said hub.

20. A valve according to claim 18, wherein said actuator is slidably mounted on said opening defining means for movement with said closure member between said open and closed positions thereof.

21. A valve according to claim 18, wherein said hub is resilient and said cooperable part is a circular rib formed on said opening defining means.

22. A valve according to claim 17, wherein said closure member and said hold-open means are located within a cavity formed within said opening defining means, a stem is connected to and extends out from a base wall of said cavity, and said actuator is slidably mounted on said stem.

23. A valve according to claim 22, wherein said opening includes at least one aperture formed through said base wall, a space between said base wall and said hold-open means, and passage means formed between said stem and said actuator, said passage means communicating with said aperture through said space when said closure member is in said open position.

24. A cooking vessel including a pressure relief valve which is a valve according to claim 1.

25. A vessel according to claim 24, including a hollow body having an open mouth through which material is moved into and out of said vessel, and a lid adapted to close said open mouth and having a part which forms said opening defining means.

26. A pressure responsive valve including, means defining an opening through which communication occurs between two sides of the valve, an actuator slidably mounted on said opening defining means for movement between open and closed positions of said valve, an annular closure member attached to said actuator for movement therewith and being operable in said closed position to engage a cooperable part of said opening defining means to prevent said communication and being not so operable in said open position, and hold-open means comprising an annular plate-like member which is formed integral with said closure member and extends therearound, said plate-like member being flexibly distortable between an operative configuration at which is operative to bias said actuator towards said open position and a different configuration at which it is not so operative, said plate-like member being of frustoconical form and being concave on one side when in said operative operative configuration at which it is operative to bias said configuration at which it is not so operative, said hold-open means being formed integral with said closure member and being responsive to movement of said closure member so as to adopt a said different configuration when said closure member is in said closed position and to adopt a said operative configuration when said closure member is at a position spaced from said closed position, and said hold-open means being operative to hold said closure member in said open position in the absence of a closing force manually applied to said closure member which is sufficient to overcome said hold-open means bias and move said closure member into said closed position.

* * * * *